United States Patent
Kasar

(10) Patent No.: US 11,714,286 B1
(45) Date of Patent: Aug. 1, 2023

(54) ACCESSORY FOR HEAD-MOUNTABLE DEVICE

(71) Applicant: Apple Inc., Cupertino, CA (US)

(72) Inventor: Darshan R. Kasar, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 106 days.

(21) Appl. No.: 17/169,258

(22) Filed: Feb. 5, 2021

Related U.S. Application Data

(60) Provisional application No. 63/006,627, filed on Apr. 7, 2020.

(51) Int. Cl.
G02B 27/01 (2006.01)

(52) U.S. Cl.
CPC ..... *G02B 27/0176* (2013.01); *G02B 27/0172* (2013.01); *G02B 2027/0187* (2013.01); *G02B 2027/0192* (2013.01)

(58) Field of Classification Search
CPC ............. G02B 27/017; G02B 27/0172; G02B 27/0176; G02B 2027/0187; G02B 2027/0192
See application file for complete search history.

(56) References Cited

U.S. PATENT DOCUMENTS

| | | |
|---|---|---|
| 2002/0159023 A1 | 10/2002 | Swab |
| 2010/0149073 A1* | 6/2010 | Chaum ................ G02B 27/017 345/8 |
| 2011/0001768 A1 | 1/2011 | Lin |
| 2016/0109931 A1* | 4/2016 | Kobayashi ........... G02B 27/017 345/212 |
| 2019/0011699 A1 | 1/2019 | Moore et al. |

FOREIGN PATENT DOCUMENTS

| | | | |
|---|---|---|---|
| EP | 2439580 | 4/2012 | |
| KR | 20070075167 A | * 7/2007 | ............. C10B 33/14 |
| WO | WO 2013/096052 | 6/2013 | |
| WO | WO 2015/100008 | 7/2015 | |

* cited by examiner

*Primary Examiner* — Vijay Shankar
*Assistant Examiner* — Cory A Almeida
(74) *Attorney, Agent, or Firm* — BakerHostetler

(57) ABSTRACT

Head-mountable devices can be supplemented with accessory devices that provide a variety of different components and functions to achieve the results that are desired by a user. The exchangeable configurations allow a user to easily customize a head-mountable device with one or more accessory devices to provide features that integrate with other operations of the head-mountable device. The accessory devices can be easily exchanged with each other to provide different components and functions at different times. Accordingly, a head-mountable device need not include permanent components that provide every function that will later be desired by the user. Instead, the head-mountable device can have expanded and customizable capabilities by the use of one or more accessory devices.

19 Claims, 2 Drawing Sheets

ACCESSORY FOR HEAD-MOUNTABLE DEVICE

CROSS-REFERENCE TO RELATED APPLICATION

This application claims the benefit of U.S. Provisional Application No. 63/006,627, entitled "ACCESSORY FOR HEAD-MOUNTABLE DEVICE," filed Apr. 7, 2020, the entirety of which is incorporated herein by reference.

TECHNICAL FIELD

The present description relates generally to head-mountable devices, and, more particularly, to removable accessory devices for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
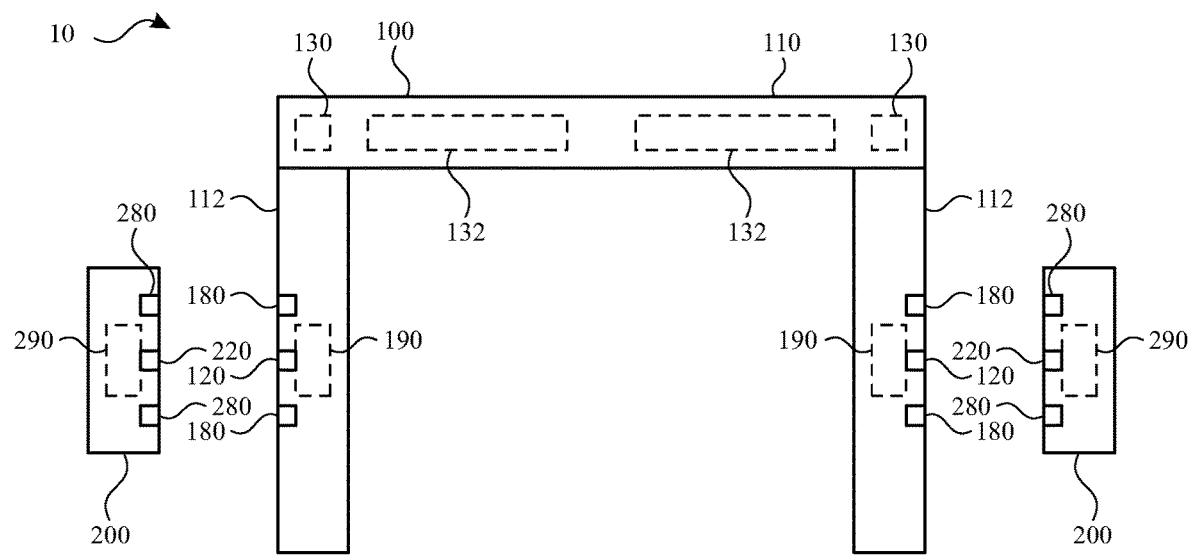
FIG. 1 illustrates a top view of a system including a head-mountable device and accessory devices, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mounted displays, headsets, visors, smartglasses, head-up display, etc., can perform a range of functions that is determined by the components (e.g., sensors, circuitry, and other hardware) included with the wearable device as manufactured. However, space, cost, and other considerations may limit the ability to provide every component that might provide a desired function. For example, different users may have different preferences regarding the components and functions that are provided by a given head-mountable device. Some users may desire certain capabilities, such as high-resolution display and long battery life, while other users may desire other capabilities, such as smaller form factor. Furthermore, a given user may desire different functions at different times. For example, a given user may desire high-resolution display at home and long battery life when outside the home.

Given the diversity of desired components and functions, it would be beneficial to allow a user to modify components and functions of a head-mountable device to customize the user experience according to the user's desires. Head-mountable devices of the present disclosure facilitate customization, adaptability, and modification by a user according to the user's desires.

Systems of the present disclosure can provide a head-mountable device with attachable and exchangeable accessory devices that provide a variety of different components and functions to achieve the results that are desired by a user. The attachable and exchangeable configurations allow a user to easily customize a head-mountable device with one or more accessory devices to provide features that integrate with other operations of the head-mountable device. The accessory devices can be easily exchanged with each other to provide different components and functions at different times. Accordingly, a main portion of the head-mountable device need not include permanent components that provide every function that will later be desired by the user. Instead, the head-mountable device can have expanded and customizable capabilities by the use of one or more accessory devices.

These and other embodiments are discussed below with reference to FIGS. 1-3. However, those skilled in the art will readily appreciate that the detailed description given herein with respect to these Figures is for explanatory purposes only and should not be construed as limiting.

According to some embodiments, for example as shown in FIG. 1, a system 10 includes a head-mountable device 100 and one or more accessory devices 200. The head-mountable device 100 includes a frame 110 that is worn on a head with one or more arms 112. The frame 110 can be positioned in front of the eyes of a user to provide information within a field of view of the user. The frame 110 can include nose pads or another feature to rest on a user's nose. The frame 110 further includes one or more display elements 132.

The frame 110 can include a housing that serves to surround a peripheral region of the frame 110 as well as support any internal components of the frame 110 in their assembled position. For example, the housing can enclose and support various internal components (including for example integrated circuit chips, processors, memory devices and other circuitry) to provide computing and functional operations for the head-mountable device 100, as discussed further herein.

The frame 110 can include and/or support one or more cameras 130. The cameras 130 can be positioned on or near an outer side of the frame 110 to capture images of views external to the head-mountable device 100. As used herein, an outer side of a portion of a head-mountable device is a side that faces away from the user and/or towards an external environment. The captured images can be visually output by the display element 132 to the user and/or stored for any other purpose. Accordingly, the display element 132 is able to accurately reproduce, simulate, or augment a view based on a view captured by the camera 130.

The display element 132 can transmit light from a physical environment for viewing by the user. Such a display element 132 can include optical properties, such lenses for vision correction based on incoming light from the physical environment. Additionally or alternatively, a display element 132 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, a frame 110 can be supported on a user's head with arms 112. The arms 112 can wrap or extend along opposing sides of a user's head, as with a temple component. The arms 112 can further include earpieces for wrapping around or otherwise engaging a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, an arm 112 can extend about a user's head to both sides of the frame 110.

Systems of the present disclosure provide a head-mountable device with attachable, removable, and/or exchangeable accessory devices that provide a variety of different components and functions to achieve the results that are desired by a user.

As used herein, "accessory" can refer to a characteristic that allows an item, such as an accessory device, to be connected, installed, removed, swapped, and/or exchanged by a user in conjunction with a head-mountable device. It will be understood that the head-mountable device can be operable with or without use of the accessory device and that the accessory device can provide additional functionality to the head-mountable device when installed. Connection of an accessory device with a head-mountable device can be performed and reversed, followed by disconnection and connection of another accessory device with the same head-mountable device or another head-mountable device with the same accessory device. As such, multiple accessory devices can be exchangeable with each other with respect to a given head-mountable device. Further, multiple head-mountable devices can be exchangeable with each other with respect to a given accessory device.

An accessory device can be connected to a head-mountable device in a manner that allows the accessory device to be removed thereafter. The connection can be fully reversible, such that when the accessory device and the head-mountable device are disconnected, each is restored to a condition held prior to the connection. The connection can be fully repeatable, such that after the accessory device and the head-mountable device are disconnected, the same or a different head-mountable device and accessory device pair can be connected in the same way. The accessory device and head-mountable device can be securely and temporarily connected, rather than permanently, fixedly, or resiliently connected (e.g., via chemical and/or molecular bond). For example, connection and disconnection of the accessory device and head-mountable device are facilitated in a manner that does not cause permanent damage, harm, or deformation to the accessory device or the head-mountable device.

An accessory device can be connected to and disconnected from a head-mountable device with ease by a user. The connection and/or disconnection can be achieved repeatedly and reversibly by hand, rather than requiring a tool. For example, a locking mechanism and/or a release mechanism can be provided on the accessory device and/or the head-mountable device for ready access by a user. A force required by a user to connect and/or disconnect the accessory device and the head-mountable device can be within a typical range for a user's fingers. For example, a force required to connect and/or disconnect the accessory device and the head-mountable device can be less than 1 N, 5 N, 10 N, 15 N, 20 N, 25 N, or 30 N. Additionally or alternatively, connection and/or disconnection can be achieved and/or facilitated by use of a tool.

An accessory device and a head-mountable device can be connected in a manner that secures the relative positions of the accessory device and the head-mountable device with respect to each other. The accessory device and the head-mountable device can be connected in a manner that provides a communication link there between. The secured positions and the communication link can both be achieved and maintained upon connection of the accessory device and the head-mountable device. The secured positions and the communication link can both be removed upon disconnection of the accessory device from the head-mountable device.

While different accessory devices can provide different features and/or functions, multiple accessory devices can be exchangeable with each other by providing at least some features that are similar or the same among the multiple accessory devices. For example, different accessory devices can be secured to a given head-mountable device by the same securement mechanism. By further example, different accessory devices can establish a communication link with the given head-mountable device via the same communication mechanism. Accordingly, a head-mountable device can accommodate the exchange of different accessory devices by providing the same securement mechanism and communication mechanism across the different accessory devices.

Likewise, an accessory device can accommodate the exchange of different head-mountable devices by providing the same securement mechanism and communication mechanism across the different head-mountable devices.

Multiple accessory devices can have other features that are similar or the same among the multiple accessory devices. For example, the multiple accessory devices can include enclosures that have the same or similar size, shape, profile, dimension, aspect ratio, surface feature, texture, color, and/or markings. The common features allow a user to exchange the accessory devices with each other while maintaining a consistent user experience across the different accessory devices when used at different times.

Additionally or alternatively, at least one of the size, shape, profile, dimension, aspect ratio, surface feature, texture, color, and/or markings can be different among multiple accessory devices. For example, different accessory devices can have different sizes and/or shapes to accommodate different head and/or face structures. This can allow a user to choose from among multiple accessory devices that provide different ergonomic features so the user can select one according to comfort provided. By further example, different accessory devices can have different aesthetic features to provide the user with different options for fashion and appearance.

Additionally or alternatively, at least one of the size, shape, profile, dimension, aspect ratio, surface feature, texture, color, and/or markings can be different among multiple head-mountable devices. For example, different head-mountable devices can have different sizes and/or shapes to accommodate different head and/or face structures. This can allow a user to choose from among multiple head-mountable devices that provide different ergonomic features so the user can select one according to comfort provided. By further example, different head-mountable devices can provide different functional features, such as different lenses for vision correction, so that a user can select a head-mountable device that is appropriate for a given activity (e.g., driving, reading, etc.). By further example, different head-mountable devices can have different aesthetic features to provide the user with different options for fashion and appearance.

Figure 2:
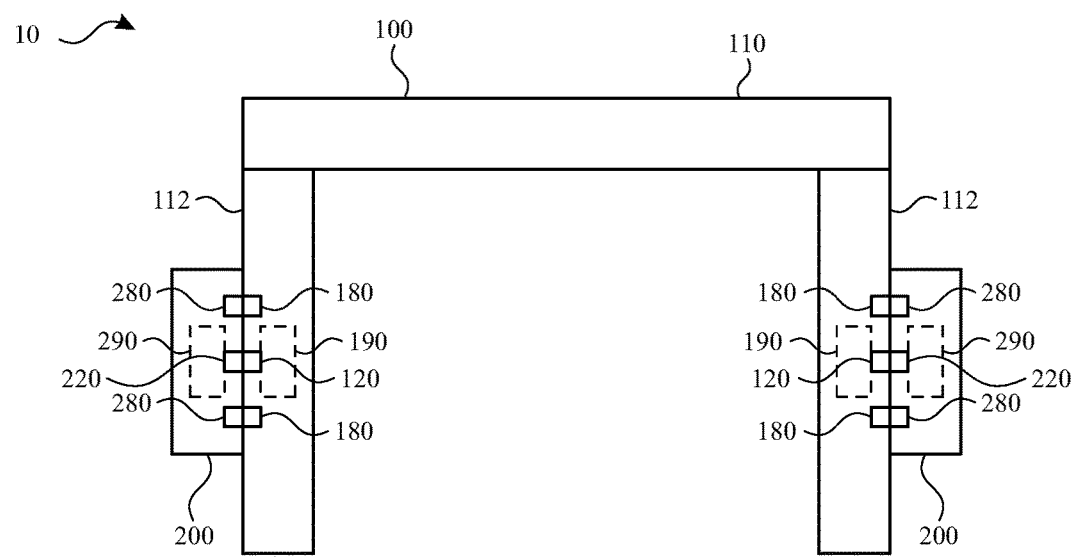
FIG. 2 illustrates another top view of the system of FIG. 1 in an assembled configuration, according to some embodiments of the present disclosure.

Referring now to FIGS. 1 and 2, a head-mountable device can be provided with one or more accessory devices for further enhancing functionality of the head-mountable device. For example, an accessory device 200 can be attached and operably connected to an arm 112. While two accessory devices are shown in FIGS. 1 and 2, it will be understood that the description herein can apply to each of any number of accessory devices.

The accessory device 200 can be provided at any portion of the head-mountable device 100, such as the arm 112 and/or the frame 110. For example, the accessory device 200 can be provided on an inner, outer, top, bottom, front, or rear side of the arm 112 and/or the frame 110. The accessory device 200 can protrude from a surface of the arm 112 and/or the frame 110. As such, the arm 112 can provide a continuous surface at its outer periphery while accepting the accessory device 200 when desired by a user. In such a configuration, the accessory device 200 can be effectively positioned to perform certain functions, such as directional sensing. For example, sensors mounted on the accessory device 200 can be oriented in directions to sense in a vicinity of the arm 112 and/or the frame 110. Alternatively, the accessory device 200 can be inset within a recess of the arm 112 and/or the frame 110, such that a portion of the accessory device 200 is flush with a portion of the arm 112 and/or the frame 110. By further example, the accessory device 200 can extend along a substantial or entire length of the head-mountable device 100 to define an outer periphery of the combined system 10. For example, the accessory device 200 can be provided as a layer that covers an entire side of an arm 112 and/or the frame 110. By extending along a substantial or entire length, the accessory device 200 can be provided with a thin cross-sectional dimension.

It will be understood that the accessory device 200 can be positioned at a location that enhances the comfort of the combined system 10 to the user when worn. For example, the accessory devices 200 can be positioned at a portion of the arm 112 and/or the frame 110 to provide a counterbalance to the weight of certain components of the head-mountable device 100. One or more electronic components and/or non-electronic components of the accessory device 200 can provide the desired weight so that the weight of the combined system 10 is distributed to enhance the comfort of the user.

As shown in FIGS. 1 and 2, the accessory device 200 can attach to the head-mountable device 100 with the HMD attachment elements 180 and the accessory attachment elements 280. Attachment can be achieved with an engagement that holds the accessory device 200 in place relative to the head-mountable device until controlled release, for example by a user.

The HMD attachment elements 180 and the accessory attachment elements 280 can include magnets that magnetically couple to each other with an attractive force for securement of the accessory device 200 to the head-mountable device 100. The magnetic arrangement and alignment of the HMD attachment elements 180 and the accessory attachment elements 280 can limit coupling to a single arrangement of the accessory device 200 relative to the head-mountable device 100 or facilitate coupling in each of multiple arrangements.

Additionally or alternatively, the HMD attachment elements 180 and the accessory attachment elements 280 can mechanically engage each other for securement of the accessory device 200 to the head-mountable device 100. The HMD attachment elements 180 and the accessory attachment elements 280 can have complementary shapes to facilitate engagement. For example, the HMD attachment elements 180 and/or the accessory attachment elements 280 can form a protrusion and the accessory attachment elements 280 and/or the HMD attachment elements 180 can form a groove. The groove can have a shape and/or size that complement the shape and/or size of the HMD attachment elements 180. It will be understood that a variety of shapes and/or sizes can be provided to achieve the engagement between the HMD attachment elements 180 and the accessory attachment elements 280. It will be further understood that any number of HMD attachment elements 180 and accessory attachment elements 280 can be provided. While certain mechanical attachment mechanisms are depicted, it will be understood that other mechanical attachment mechanisms are also contemplated.

Additionally or alternatively, the accessory attachment element 280 can be pressed, snap fit or otherwise inserted into the HMD attachment element 180. Once inserted, the accessory attachment element 280 can be locked or otherwise secured within the HMD attachment element 180. Additional or alternative mechanisms can be provided to lock the accessory device 200 in place with respect to the head-mountable device 100. For example, mechanisms such as locks, latches, snaps, screws, clasps, threads, magnets, pins, an interference (e.g., friction) fit, knurl presses, bayoneting, and/or combinations thereof can be included to lock the accessory device 200 to the head-mountable device 100 when the HMD attachment elements 180 and the accessory attachment elements 280 engage each other.

The accessory device 200 can optionally remain locked from moving with respect to the head-mountable device 100 until a release mechanism is actuated. The release mechanism can be provided on an outer surface of the head-mountable device 100 for access by a user. For example, the release mechanism can be provided on an outer surface of the head-mountable device 100 and/or the accessory device 200. Where a locking mechanism locks the accessory device 200 in place with respect to the head-mountable device 100, the release mechanism, when actuated, can move and act upon the locking mechanism to cause it to release. For example, the release mechanism, when actuated, can release one or more locks, latches, snaps, screws, clasps, threads, magnets, pins, an interference (e.g., friction) fit, knurl presses, bayoneting, and/or combinations thereof that were previously locking the accessory device 200 to the head-mountable device 100. At least some of the interactions between the release mechanism and a locking mechanism can be within the head-mountable device 100 and/or the accessory device 200.

An electrical or other communication connection can be made and maintained upon mechanical securement of the HMD attachment element 180 and the accessory attachment element 280, for example via an HMD communication interface 120 and an accessory communication interface 220. When the head-mountable device 100 is connected to the accessory device 200, components thereof can be in operative communication.

As further shown in FIGS. 1 and 2, the head-mountable device 100 can be provided with a HMD communication interface 120, and the accessory device 200 can be provide with an accessory communication interface 220. The HMD communication interface 120 and the accessory communication interface 220 can include pairs of conductive contact that are configured to make electrical contact when the HMD attachment element 180 and the accessory attachment element 280 are engaged with each other. For example, one or more of the HMD communication interface 120 and the accessory communication interface 220 can include a moveable element for making an electrical connection, such as a pogo pin that is at least partially collapsible and/or a contact pad that is at least partially flexible. By further example, a pogo pin can be spring loaded and/or a contact pad can be formed from an electrically conductive foam or elastomer.

Additionally or alternatively, the HMD communication interface 120 and the accessory communication interface 220 can include connectors that are manually connected to establish a communication interface apart from the engagement with the HMD attachment elements 180 and the accessory attachment elements 280. Such connectors can include ZIF connectors, non-ZIF connectors, slider connectors, flip actuator connectors, and/or FPC-to-Board connectors. Additionally or alternatively, the HMD communication interface 120 and/or the accessory communication interface 220 can provide direct (e.g., board-to-board) connection between controllers of the head-mountable device 100 and the accessory device 200.

It will be understood that a variety of other communication links can be provided between the HMD communication interface 120 and the accessory communication interface 220. No direct contact may be required to establish a communication link. For example, a communication link between the HMD communication interface 120 and the arm communication interface can include wireless interfaces, Bluetooth interfaces, Near Field Communication interfaces, magnetic interfaces, inductive interfaces, resonant interfaces, capacitive coupling interfaces, Wi-Fi interfaces, optical interfaces, acoustic interfaces, and/or other communication interfaces.

The HMD communication interface 120 and the accessory communication interface 220 can facilitate communication (e.g., transfer) of power, data, or other signals between components of the accessory device 200 and the head-mountable device 100. For example, the link between the HMD communication interface 120 and the accessory communication interface 220 can facilitate communication between an HMD component 190 of the head-mountable device 100 and an accessory component 290 of the accessory device 200. The communication link can allow the accessory component 290 of the accessory device 200 to provide its functionality to the HMD component 190 of the head-mountable device 100, as discussed further herein.

Figure 3:
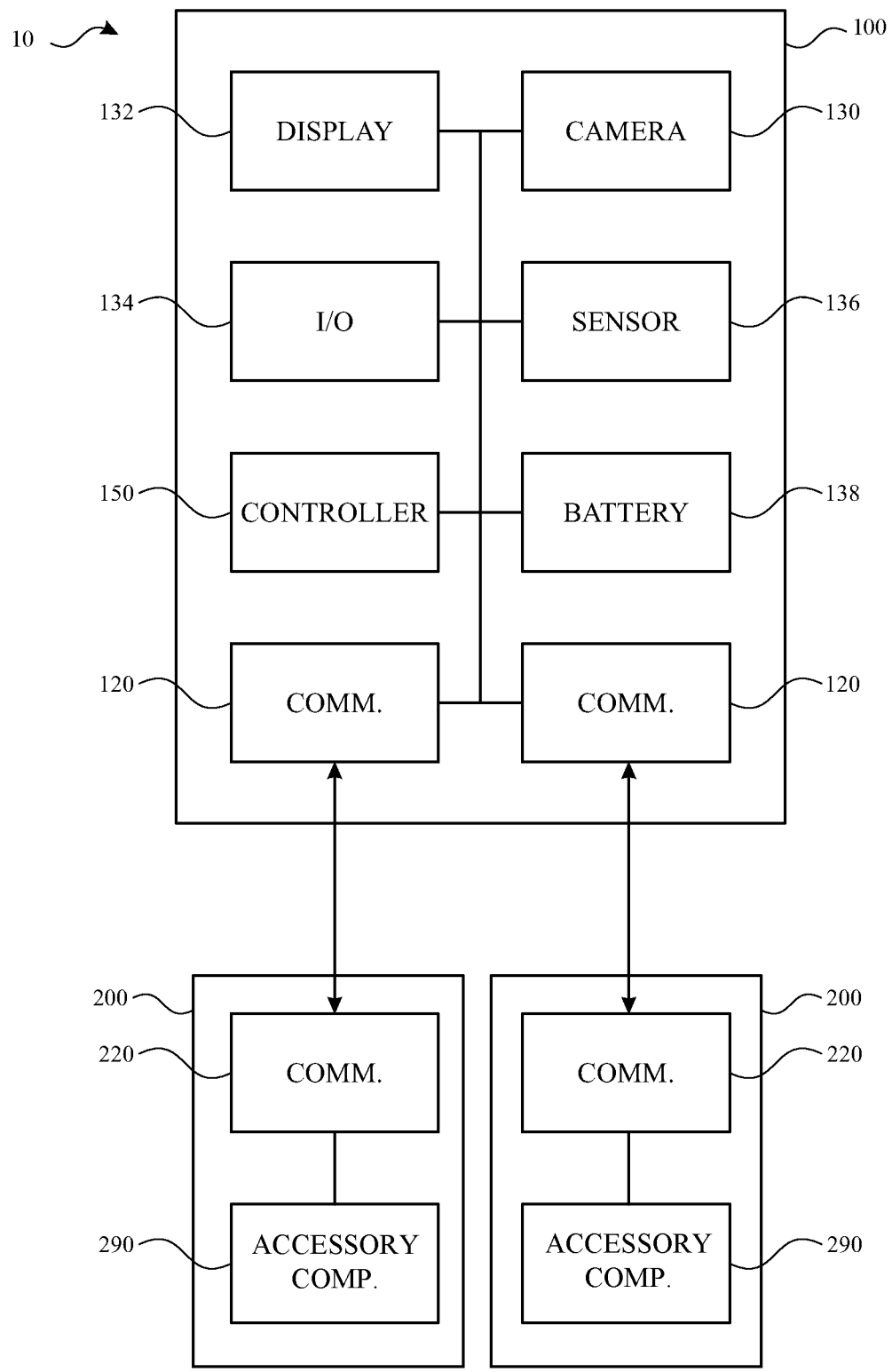
FIG. 3 illustrates a block diagram of system including a head-mountable device and accessory devices, in accordance with some embodiments of the present disclosure.

FIG. 3 illustrates a block diagram of a system including a head-mountable device and one or more accessory devices, in accordance with some embodiments of the present disclosure. It will be appreciated that components described herein can be provided on either or both of a head-mountable device and/or an accessory device. In some embodiments, components are provided by an accessory device instead of a head-mountable device to reduce redundancy and increase customization based on a selection of accessory devices.

It will be understood that any one or more of the components of the head-mountable device 100 described herein can correspond to the HMD component 190 of FIGS. 1 and 2. As such, the accessory component 290 of the accessory device 200 can interact with any one or more of the components of the head-mountable device 100 illustrated in FIG. 3.

As shown in FIG. 3, the head-mountable device 100 can include a controller 150 with one or more processing units that include or are configured to access a memory having instructions stored thereon. The instructions or computer programs may be configured to perform one or more of the operations or functions described with respect to the head-mountable device 100. The controller 150 can be implemented as any electronic device capable of processing, receiving, or transmitting data or instructions. For example, the controller 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the head-mountable device 100. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The head-mountable device 100 can include a camera 130 for capturing a view of an environment external to the head-mountable device 100. The camera 130 can include an optical sensor, such as a photodiode or a photodiode array. Additionally or alternatively, the camera 130 can include one or more of various types of optical sensors that are arranged in various configurations for detecting user inputs described herein. The camera 130 may be configured to capture an image of a scene or subject located within a field-of-view of the camera 130. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 100 can further include a display element 132 for displaying visual information for a user. The display element 132 can provide visual (e.g., image or video) output. The display element 132 can be or include an opaque, transparent, and/or translucent display. A transparent or translucent display element 132 may have a medium through which light representative of images is directed to a user's eyes. The display element 132 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The head-mountable device 100 can include an input/output component 134, which can include any suitable component for connecting head-mountable device 100 to other devices. Suitable components can include, for example, audio/video jacks, data connectors, or any additional or alternative input/output components. The input/output component can include buttons, keys, or another feature that can act as a keyboard for operation by the user. As such, the description herein relating to keyboards can apply to keyboards, keys, and/or other input features integrated on the head-mountable device 100. Such an input/output component can be fixedly or removably attached to a display unit of the head-mountable device 100.

The head-mountable device 100 can include communications circuitry for communicating with one or more servers or other devices using any suitable communications protocol. For example, communications circuitry can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry can also include an antenna for transmitting and receiving electromagnetic signals.

The sensor 136 may also include various sensors that detect conditions pertaining to the user, the head-mountable device 100, and/or the head-securement element. For example, in addition to the camera 130, the head-mountable device 100 may include motion sensors, such as one or more of accelerometers, gyroscopes, magnetometers, inertial measurement units (IMU), cameras, or the like, which measure conditions pertaining to the position and/or orientation of the head of the user and/or the head-mountable device 100.

The sensor 136 can include one or more eye sensors for tracking features of the user wearing the head-mountable device 100, including conditions of the user's eye (e.g., focal distance, pupil size, etc.). For example, such sensors can perform facial feature detection, facial movement detection, facial recognition, eye tracking, user mood detection, user emotion detection, voice detection, etc. For example, an eye sensor can optically capture a view of an eye (e.g., pupil) and determine a direction of a gaze of the user. Such eye tracking may be used to determine a location and/or direction of interest. Detection and/or amplification of sound can then be focused if it is received from sources at such a location and/or along such a direction.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

The head-mountable device 100 can include a battery 138, which can charge and/or power components of the head-mountable device 100. The battery 138 can also charge and/or power components connected to the head-mountable device 100.

The head-mountable device 100 can include the HMD communication interface 120 for communicating with the accessory device 200 via the accessory communication interface 220. The head-mountable device 100 can provide one or more HMD communication interfaces 120 for communicating with a corresponding number of accessory devices 200. Additionally or alternatively, a number of accessory devices 200 can communicate with the head-mountable device 100 via a smaller or greater number of HMD communication interfaces 120.

As further shown in FIG. 3, one or more accessory devices 200 include components to perform selected functions and to interact with the head-mountable device 100. While the accessory devices 200 of FIG. 3 are illustrated as being substantially similar, it will be understood that accessory devices 200 can be provided simultaneously with different features.

Each accessory device 200 can be controlled at least in part by the controller 150 of the head-mountable device 100. For example, while the accessory device 200 is connected to the head-mountable device 100, the controller 150 of the head-mountable device 100 can operably connect to and/or control one or more components of the accessory device 200 via the communication link provided by the HMD communication interface 120 and the accessory communication interface 220.

Additionally or alternatively, the head-mountable device 100 can be controlled at least in part by the accessory component 290 of the accessory device 200. For example, while the accessory device 200 is connected to the head-mountable device 100, the accessory component 290 of an accessory device 200 can operably connect to and/or control one or more components of the head-mountable device 100 via the communication link provided by the HMD communication interface 120 and the accessory communication interface 220.

In some embodiments, the accessory device 200 can operate as a power source for the head-mountable device 100. By providing power with a removable accessory device, the user can select such an accessory device according to anticipated power needs. The accessory component 290 can include a battery that is used to store and provide power to the head-mountable device 100 and/or the accessory device 200. Optionally, the accessory device 200 can recharge the battery 138 of the head-mountable device 100, for example, by directing power from the accessory component 290 (e.g., battery) across the HMD communication interface 120 and the accessory communication interface 220. Other pathways are contemplated, such as another link or wireless charging. The battery can be a replaceable battery, a rechargeable battery. Additionally or alternatively, the accessory component 290 can be a tethered power source that receives power from a source external to the accessory device 200, such as from a USB cable, Lightening cable, or other interface. One or more batteries of the head-mountable device can transfer power to and/or receive power from another device. Such power transfer can be wired and/or wireless.

Further examples of accessory components 290 include speakers. Such speakers can be operated in concert with or independently of the speakers of the head-mountable device 100. Speakers of the accessory device 200 can be provided and operated at locations that enhance the audio output of the combined system 10. For example, the speakers of the accessory device 200 can be operated to provide spatial audio to the user.

Further examples of accessory components 290 include cameras. Such cameras can be operated in concert with or independently of the cameras 130 of the head-mountable device 100. Cameras of the accessory device 200 can be provided and operated at locations that enhance the visual capture capabilities of the combined system 10. For example, the cameras of the accessory device 200 (optionally with the cameras 130 of the head-mountable device 100) can be operated in concert to capture a combined image that spans a wide field of view. For example, the field of view can be greater than 90°, 180°, 270°, or up to 360°. Images captured by one or more of the cameras of the accessory device 200 can be displayed on the display element 132 of the head-mountable device 100.

Further examples of accessory components 290 include microphones. Such microphones can be operated in concert with or independently of microphones of the head-mountable device 100. Microphones of the accessory device 200 can be provided and operated at locations that enhance the audio capture capabilities of the combined system 10. For example, the microphones of the accessory device 200 can be operated to capture directional audio from an environment of the user.

Further examples of accessory components 290 include sensors. By providing sensing capabilities with a removable module, the user can select such an accessory device 200 when sensing particular conditions is desired. Such sensors can be configured to sense substantially any type of characteristic such as, but not limited to, images, pressure, light, touch, force, temperature, position, motion, and so on. For example, the sensor may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment. The sensor can be provided with exposure to the environment, for example with an opening in the accessory device 200.

Further examples of accessory components 290 include bio-sensors. By providing bio-sensing capabilities with a removable module, the user can select such an accessory device 200 when tracking biometric characteristics, such as health and activity metrics, is desired. The one or more bio-sensors can include optical and/or electronic biometric sensors that may be used to compute one or more biometric characteristics. For example, a bio-sensor can include a light source and a photodetector to form a photoplethysmography (PPG) sensor. An optical (e.g., PPG) sensor or sensors may be used to compute various biometric characteristic including, without limitation, a heart rate, a respiration rate, blood oxygenation level, a blood volume estimate, blood pressure, or a combination thereof. One or more of the bio-sensors may also be configured to perform an electrical measurement using one or more electrodes. The electrical sensor(s) may be used to measure electrocardiographic (ECG) characteristics, galvanic skin resistance, and other electrical properties of the user's body. Additionally or alternatively, a bio-sensor can be configured to measure body temperature, exposure to UV radiation, and other health-related information.

Further examples of accessory components 290 include user sensors. Such sensors can be used to detect features relating to the user wearing the head-mountable device and/or other individuals. For example, user sensors can perform facial feature detection, facial movement detection, facial recognition, eye tracking, user mood detection, user emotion detection, voice detection, etc.

Further examples of accessory components 290 include components for receiving input from a user, providing output to a user, and/or performing other functions. Examples of such components include a speaker, a microphone, a display, a touch sensor, a haptic device, a camera, an optical sensor, a magnet, a gyroscope, an accelerometer, and/or another I/O component. The I/O components can be used to detect and interpret user inputs. The I/O components can be used to provide information to the user. The I/O components can also be used to capture information relating to the user and/or the environment.

Examples of accessory components 290 include display drivers. By providing display drivers with a removable module, the user can select such an accessory device 200 when certain display features are desired. Such display drivers can be configured to control the display element 132 of the head-mountable device 100.

Each accessory device 200 can further include any number of accessory components 290. By providing electronic components on a removable accessory device, the user can optionally provide an appropriate accessory device when selected functions are desired. At other times, other accessory devices or no accessory device can be selected, thereby reducing the need to have all features available at all times in the head-mountable device 100.

The head-mountable device 100 can provide an output to a user based on an action relating to the accessory device 200. For example, the head-mountable device 100 can provide an output upon attachment and/or removal of the accessory device 200 with respect to the head-mountable device 100. By further example, the head-mountable device 100 can provide an output upon detection of a user input provided at the accessory device 200. The output provided by the head-mountable device 100 can include a confirmation relating to an operation and/or condition (e.g., installed, absent, active, inactive, charged, etc.) of the accessory device 200. The output provided by the head-mountable device 100 can include a prompt relating to an action for the user to perform. The output can be provided according to the operation of the controller 150 of the head-mountable device 100 and produce by one or more components of the head-mountable device 100 that is operably connected to the controller 150. For example, the output can be a visual output produced by the display element 132, an audio output produced by the speaker, a haptic output produced by a haptic device, or another output that is detectable by the user and produced by another component of the head-mountable device.

Additionally or alternatively, the head-mountable device 100 can alter one or more parameters of its operations based on the presence, absence, or other condition of the accessory device 200. For example, when the accessory device 200 is installed, the head-mountable device 100 may perform an action the utilized the functions of the accessory device 200. By further example, when the accessory device 200 is absent, the head-mountable device 100 may perform an action that does not rely on the functions of the accessory device 200. Additionally or alternatively, the head-mountable device 100 may perform actions in a manner that consumes power based on the presence, absence, and/or amount of power provided by an accessory device 200. For example, the head-mountable device 100 can perform an action with greater power consumption (e.g., high-resolution display output, enhanced audio and/or imaging processing, communication with external devices) when a battery of the accessory device 200 is present and sufficiently charged, and the head-mountable device 100 can perform an action with lower power consumption (e.g., low-resolution display output, reduced audio and/or imaging processing, reduced communication with external devices) or refrain from performing such an action when a battery of the accessory device 200 is absent or not sufficiently charged.

The accessory device 200 can be configured to interact with at least one other device other than the head-mountable device 100. For example, the accessory device 200 can be charged by an external device with a power source, so that the battery of the accessory device 200 carries a charge for transfer to the head-mountable device 100. Communication between an external device and the accessory device 200 can optionally be conducted via the accessory communication interface 220 of the accessory device 200. Such an external device can further be configured to interact independently with the head-mountable device 100, for example to charge the battery 138 of the head-mountable device 100. Communication between an external device and the head-mountable device 100 can optionally be conducted via the HMD communication interface 120 of the head-mountable device 100.

It will be understood that the components of either the head-mountable devices or accessory devices discussed herein can be provided on either or both of the head-mountable device and/or the accessory device. Furthermore, selection of different accessory devices provides a customized experience for a user.

It will be recognized that the difference in functionality between accessory devices can refer to both the purpose of a component as well as the parameters of its operation. For example, while the components of different accessory devices can both be for a common purpose, the components can operate differently to achieve the purpose. For example, different components can be for sensing different conditions based on the operations desired by a user. Other variations, such as size, shape, and material selection can be provided so the user can select the accessory device that is best suited for the user's comfort and/or performance of the component.

The different accessory devices can also differ in mechanical configuration such as material properties and/or structural features, which can help define shape, size, flexibility, rigidity, tactile feel, and/or aesthetic properties such as color, patterns, and/or materials to provide a different look and feel. Furthermore, each of the accessory devices may have a different enclosure having a different color, material, shape, accoutrements, patterns, etc. The enclosures can provide different aesthetic features, cosmetic features, and/or a look and feel than the other enclosures in the system.

While the components of different accessory devices can differ, the accessory devices can have the same or similar accessory communication interfaces, so that each of the multiple accessory devices can attach to and communication with the same head-mountable device in the same or similar manner.

Accordingly, each accessory device is configured to provide a different function and/or aesthetic feature than one or more other accessory devices in the system. As such, the user can select the accessory device with the desired functionality and/or look and feel. This may be at the time of purchase, thus allowing differentiation from other purchasers, or it may be that all or some portion of the accessory devices come in a set such that the user can select the desired accessory devices for the right moment. In one example, one accessory device may be configured for use outside the home, while another may be configured for use at home. Any combination of aesthetic and functional features may be provided to create a different head-mountable device. When combined with the different head-mountable devices, the system becomes highly customizable. The user can create a different head-mountable device by selecting one head-mountable device to go along with one set of accessory devices. If multiple systems are provided, any number of different head-mountable device configurations can be made.

Accordingly, embodiments of the present disclosure provide a head-mountable device with exchangeable accessory devices that provide a variety of different components and functions to achieve the results that are desired by a user. The exchangeable configurations allow a user to easily customize a head-mountable device with one or more accessory devices to provide features that integrate with other operations of the head-mountable device. The accessory devices can be easily exchanged with each other to provide different components and functions at different times. Accordingly, a head-mountable device of the present disclosure need not include permanent components that provide every function that will later be desired by the user. Instead, the head-mountable device can have expanded and customizable capabilities by the use of one or more accessory devices.

Various examples of aspects of the disclosure are described below as clauses for convenience. These are provided as examples, and do not limit the subject technology.

Clause A: a system comprising: a head-mountable device comprising: a frame; an arm configured to secure the frame to a head of a user; a controller; a display element within the frame; a first attachment element; and a first communication interface; and an accessory device comprising: a second attachment element for releasably engaging the first attachment element; a second communication interface; and an accessory component, wherein, when the first attachment element is engaged with the second attachment element, the controller is operably connected to the accessory component via the first communication interface and the second communication interface.

Clause B: a system comprising: a head-mountable device comprising: a frame; an arm configured to secure the frame to a head of a user; a controller; and an attachment element; a first accessory device comprising a first accessory component for performing a first function, wherein the first accessory component is operably connected to the controller when the first accessory device is attached to the attachment element; and a second accessory device comprising a second accessory component for performing a second function, different than the first function, wherein the second accessory component is operably connected to the controller when the second accessory device is attached to the attachment element.

Clause C: a system comprising: a head-mountable device comprising: a controller; and a display element; and an accessory device removably attachable to the head-mountable device and comprising an accessory component operably connected to the controller when the accessory device is attached to the head-mountable device, the accessory device being exchangeable with other accessory devices that are removably attachable to the head-mountable device, wherein the controller is configured to provide an output to a user based on an operation of the accessory device and while the accessory device is attached to the head-mountable device.

One or more of the above clauses can include one or more of the features described below. It is noted that any of the following clauses may be combined in any combination with each other, and placed into a respective independent clause, e.g., clause A, B, or C.

Clause 1: the arm is a first arm extending from a first side of the frame and supporting the first attachment element and the first communication interface; the head-mountable device further comprises: a second arm extending from a second side of the frame; a third attachment element on the second arm; and a third communication interface on the second arm; and the system further comprises an additional accessory device comprising: a fourth attachment element; a fourth communication interface; and an additional accessory component, wherein, when the third attachment element is engaged with the fourth attachment element, the controller is operably connected to the additional accessory component via the third communication interface and the fourth communication interface.

Clause 2: the first attachment element and the first communication interface are positioned on the arm of the head-mountable device.

Clause 3: the first attachment element and the first communication interface are positioned on the frame of the head-mountable device.

Clause 4: the head-mountable device further comprises: a camera; an eye sensor; a microphone; a speaker; and a battery.

Clause 5: the accessory component comprises a sensor.

Clause 6: the accessory component comprises a battery.

Clause 7: the accessory device is magnetically mountable to the head-mountable device by a magnetic coupling between the first attachment element and the second attachment element.

Clause 8: when the first attachment element is engaged with the second attachment element, the first communication interface is communicatively connected to the second communication interface via a wireless communication link.

Clause 9: a release mechanism on an outer surface of the head-mountable device for releasing the accessory device from the head-mountable device.

Clause 10: the arm is a first arm extending from a first side of the frame; the attachment element is a first attachment element on the first arm; the head-mountable device further comprises: a second arm extending from a second side of the frame; and a second attachment element on the second arm; the first accessory component is operably connected to the controller when the first accessory device is attached to the second attachment element; and the second accessory component is operably connected to the controller when the second accessory device is attached to the second attachment element.

Clause 11: the first accessory device is magnetically mountable to the head-mountable device by a magnetic coupling between the attachment element and a first accessory attachment element of the first accessory device; and the second accessory device is magnetically mountable to the head-mountable device by a magnetic coupling between the attachment element and a second accessory attachment element of the second accessory device.

Clause 12: when the first accessory device is attached to the attachment element, the first accessory component is operably connected to the controller via a first wireless communication link; and when the second accessory device is attached to the attachment element, the second accessory component is operably connected to the controller via a second wireless communication link.

Clause 13: the head-mountable device further comprises a release mechanism on an outer surface of the head-mountable device for releasing the first accessory device or the second accessory device from the attachment element.

Clause 14: the output is a visual output produced by the display element.

Clause 15: the head-mountable device further comprises a speaker; and the output is an audio output produced by the speaker.

Clause 16: the head-mountable device further comprises a haptic device; and the output is a haptic output produced by the haptic device.

Clause 17: the head-mountable device further comprises a first battery; the accessory device comprises a second battery; and the controller is configured to: perform a first action with a first power consumption when the accessory device is connected to the head-mountable device; and perform a second action with a second power consumption, lower than the first power consumption, when the accessory device is not connected to the head-mountable device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A system comprising:
   a head-mountable device comprising:
      a frame;
      an arm configured to secure the frame to a head of a user;
      a display element;
      a communication interface;
      a controller; and
      an attachment element;
   a first accessory device comprising a battery for performing a first function comprising transferring power to the head-mountable device, wherein the battery is operably connected to the controller when the first accessory device is attached to the attachment element; and
   a second accessory device comprising an accessory component for performing a second function, different than the first function, wherein the accessory component is operably connected to the controller when the second accessory device is attached to the attachment element,
   wherein the controller is configured to:
      when the first accessory device is connected to the head-mountable device, operate the display element at a first resolution and operate the communication interface to perform enhanced communication with an external device; and
      when the first accessory device is not connected to the head-mountable device, operate the display element at a second resolution, lower than the first resolution, and operate the communication interface to perform reduced communication with the external device.

2. The system of claim 1, wherein:
   the arm is a first arm extending from a first side of the frame;
   the attachment element is a first attachment element on the first arm;
   the head-mountable device further comprises:
      a second arm extending from a second side of the frame; and
      a second attachment element on the second arm;
   the battery is operably connected to the controller when the first accessory device is attached to the second attachment element; and
   the accessory component is operably connected to the controller when the second accessory device is attached to the second attachment element.

3. The system of claim 1, wherein:
   the first accessory device is magnetically mountable to the head-mountable device by a magnetic coupling between the attachment element and a first accessory attachment element of the first accessory device; and
   the second accessory device is magnetically mountable to the head-mountable device by a magnetic coupling between the attachment element and a second accessory attachment element of the second accessory device.

4. The system of claim 1, wherein:
   when the first accessory device is attached to the attachment element, the battery is operably connected to the controller via a first wireless communication link; and
   when the second accessory device is attached to the attachment element, the accessory component is operably connected to the controller via a second wireless communication link.

5. The head-mountable device of claim 1, wherein the head-mountable device further comprises a release mechanism on an outer surface of the head-mountable device for releasing the first accessory device or the second accessory device from the attachment element.

6. A system comprising:
a head-mountable device comprising:
- a frame;
- an arm configured to secure the frame to a head of a user;
- a controller;
- a display element within the frame;
- a microphone;
- a speaker;
- a first attachment element; and
- a first communication interface; and an accessory device comprising:
- a second attachment element for releasably engaging the first attachment element;
- a second communication interface; and
- a battery, wherein, when the first attachment element is engaged with the second attachment element, the controller is operably connected to the battery via the first communication interface and the second communication interface,
wherein the controller is configured to:
when the accessory device is connected to the head-mountable device, operate the display element at a first resolution and operate the microphone and the speaker to perform enhanced audio processing; and
when the accessory device is not connected to the head-mountable device, operate the display element at a second resolution, lower than the first resolution, and operate the microphone and the speaker to perform reduced audio processing.

7. The system of claim 6, wherein:
the arm is a first arm extending from a first side of the frame and supporting the first attachment element and the first communication interface;
the head-mountable device further comprises:
- a second arm extending from a second side of the frame;
- a third attachment element on the second arm; and
- a third communication interface on the second arm; and
the system further comprises an additional accessory device comprising:
- a fourth attachment element;
- a fourth communication interface; and
- an additional battery, wherein, when the third attachment element is engaged with the fourth attachment element, the controller is operably connected to the additional battery via the third communication interface and the fourth communication interface.

8. The system of claim 6, wherein the first attachment element and the first communication interface are positioned on the arm of the head-mountable device.

9. The system of claim 6, wherein the first attachment element and the first communication interface are positioned on the frame of the head-mountable device.

10. The system of claim 6, wherein the head-mountable device further comprises:
- a camera; and
- an eye sensor.

11. The system of claim 6, wherein the accessory device further comprises a sensor.

12. The system of claim 6, wherein the accessory device is magnetically mountable to the head-mountable device by a magnetic coupling between the first attachment element and the second attachment element.

13. The system of claim 6, wherein, when the first attachment element is engaged with the second attachment element, the first communication interface is communicatively connected to the second communication interface via a wireless communication link.

14. The system of claim 6, further comprising a release mechanism on an outer surface of the head-mountable device for releasing the accessory device from the head-mountable device.

15. A system comprising:
a head-mountable device comprising:
- a controller;
- a first battery;
- a camera; and
- a display element; and an accessory device removably attachable to the head-mountable device and comprising a second battery operably connected to the controller when the accessory device is attached to the head-mountable device, the accessory device being exchangeable with other accessory devices that are removably attachable to the head-mountable device, wherein the controller is configured to:
provide an output to a user based on an operation of the accessory device and while the accessory device is attached to the head-mountable device;
when the accessory device is connected to the head-mountable device, operate the display element at a first resolution and operate the camera to perform enhanced imaging processing; and
when the accessory device is not connected to the head-mountable device, operate the display element at a second resolution, lower than the first resolution and operate the camera to perform reduced imaging processing.

16. The system of claim 15, wherein the output is a visual output produced by the display element.

17. The system of claim 15, wherein:
the head-mountable device further comprises a speaker; and
the output is an audio output produced by the speaker.

18. The system of claim 15, wherein:
the head-mountable device further comprises a haptic device; and
the output is a haptic output produced by the haptic device.

19. The system of claim 15, further comprising a microphone and a speaker, wherein the controller is further configured to:
perform enhanced audio processing when the accessory device is connected to the head-mountable device; and
perform reduced audio processing when the accessory device is not connected to the head-mountable device.

* * * * *

UNITED STATES PATENT AND TRADEMARK OFFICE
CERTIFICATE OF CORRECTION

PATENT NO. : 11,714,286 B1
APPLICATION NO. : 17/169258
DATED : August 1, 2023
INVENTOR(S) : Darshan R. Kasar Page 1 of 1

It is certified that error appears in the above-identified patent and that said Letters Patent is hereby corrected as shown below:

In the Claims

Column 23, Line 1 (Claim 5):
"head-mountable device"
Should read:
--system--

Signed and Sealed this
Twenty-sixth Day of December, 2023

*Katherine Kelly Vidal*

Katherine Kelly Vidal
*Director of the United States Patent and Trademark Office*